Aug. 29, 1944. J. H. SINGLETON 2,357,141
POISON OR FERTILIZER DISTRIBUTING MACHINE
Filed Jan. 27, 1943 3 Sheets-Sheet 2

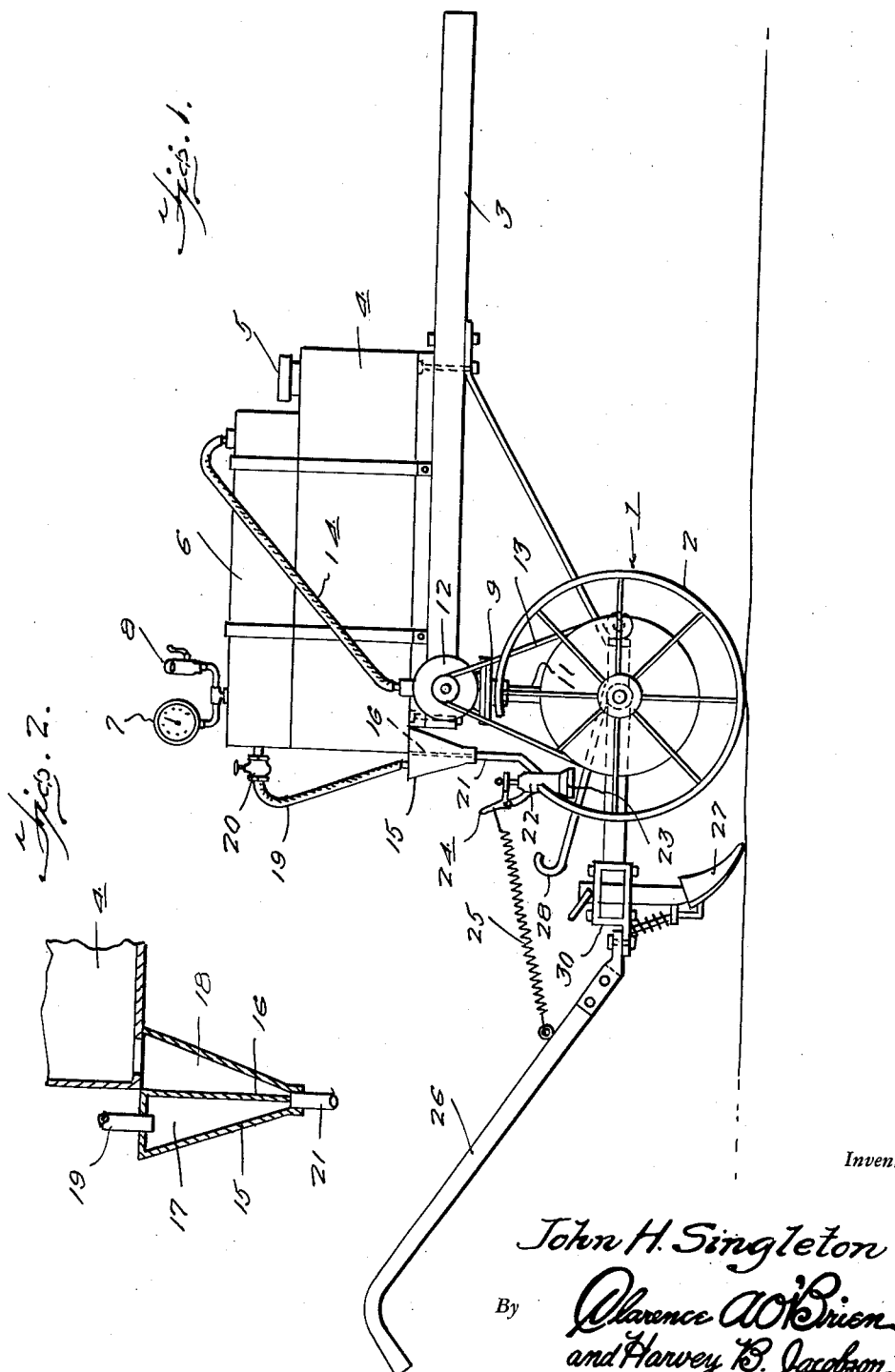

Inventor
John H. Singleton
By Clarence A. O'Brien
and Harvey B. Jacobson
Attorneys Aug. 29, 1944.  J. H. SINGLETON  2,357,141
POISON OR FERTILIZER DISTRIBUTING MACHINE
Filed Jan. 27, 1943  3 Sheets-Sheet 3
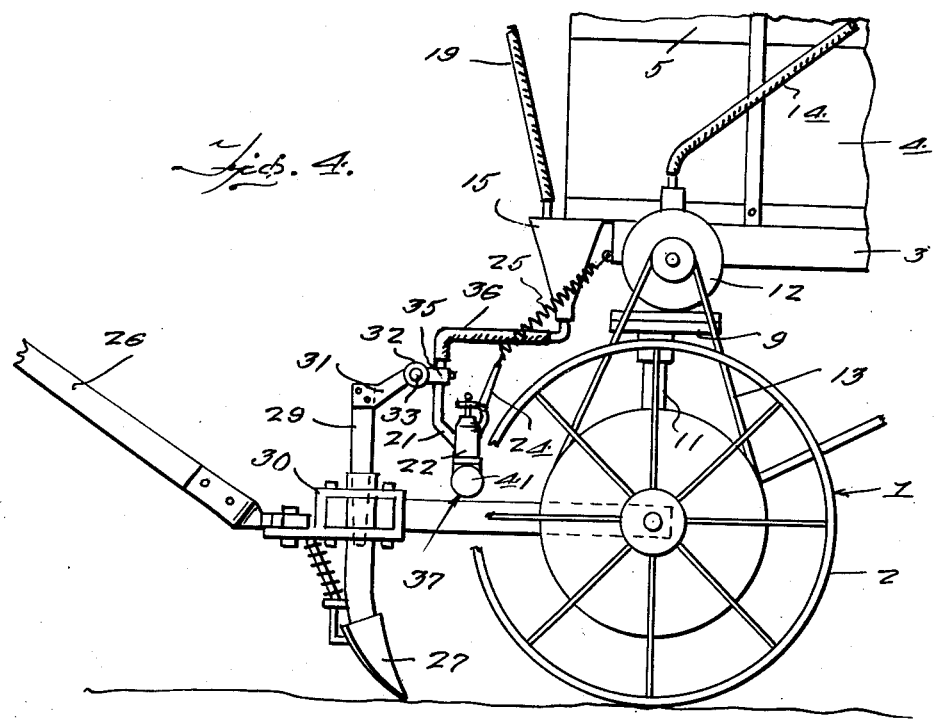
Fig. 4.
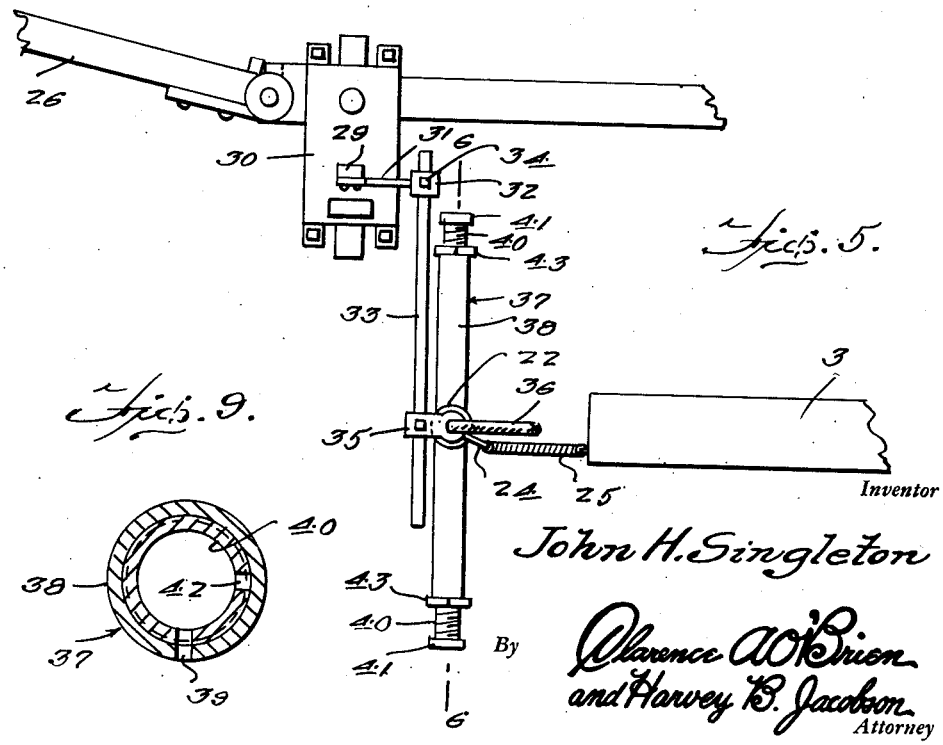
Fig. 5.
Fig. 9.
Inventor
John H. Singleton
By Clarence A. O'Brien
and Harvey B. Jacobson
Attorney Patented Aug. 29, 1944

2,357,141

UNITED STATES PATENT OFFICE 2,357,141

POISON OR FERTILIZER DISTRIBUTING MACHINE

John Henry Singleton, Prattville, Ala.

Application January 27, 1943, Serial No. 473,729

3 Claims. (Cl. 97—179)

The present invention relates to new and useful improvements in poison or fertilizer distributing machines and has for its primary object to provide, in a manner as hereinafter set forth, an apparatus of this character which is adapted to be expeditiously mounted for operation on walking and tractor cultivators, particularly the former, without the necessity of making material structural alterations therein.

Another very important object of the invention is to provide a machine of the aforementioned character comprising novel means for controlling and regulating the discharge of the fluid.

Other objects of the invention are to provide a distributing machine of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing an apparatus constructed in accordance with the present invention installed for operation as a poison sprayer or distributor on a walking cultivator.

Figure 2 is a detail view in vertical section through the partitioned funnel which receives the fluid and air from their respective tanks.

Figure 4 is a view in side elevation, showing the apparatus installed for operation as a fertilizer distributor on a walking cultivator.

Figure 5 is a top plan view of the fertilizer distributor.

Figure 6:
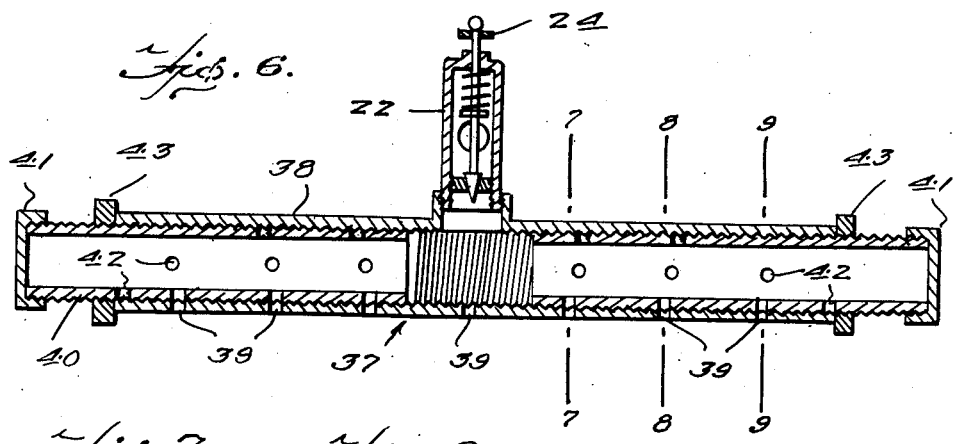
Figure 6 is a view in vertical longitudinal section, taken substantially on the line 6—6 of Figure 5.
Figures 7, 8:
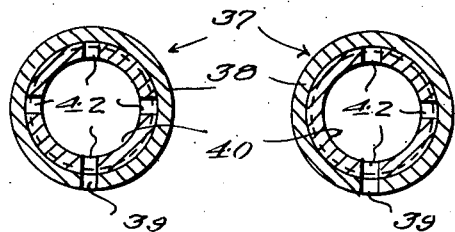

Figures 7, 8 and 9 are cross sectional views taken substantially on the lines 7—7, 8—8 and 9—9, respectively, of Figure 6.

Referring now to the drawings in detail, it will be seen that reference numeral 1 designates generally a conventional walking cultivator comprising supporting wheels 2, a tongue 3, etc.

Mounted on the cultivator 1 is a fluid tank 4. The tank 4 is provided, on its forward end portion, with a filler neck 5. An air tank 6 is mounted on the tank 4. The air tank 6 is provided with a pressure gauge 7 and a safety valve 8.

Figure 3:
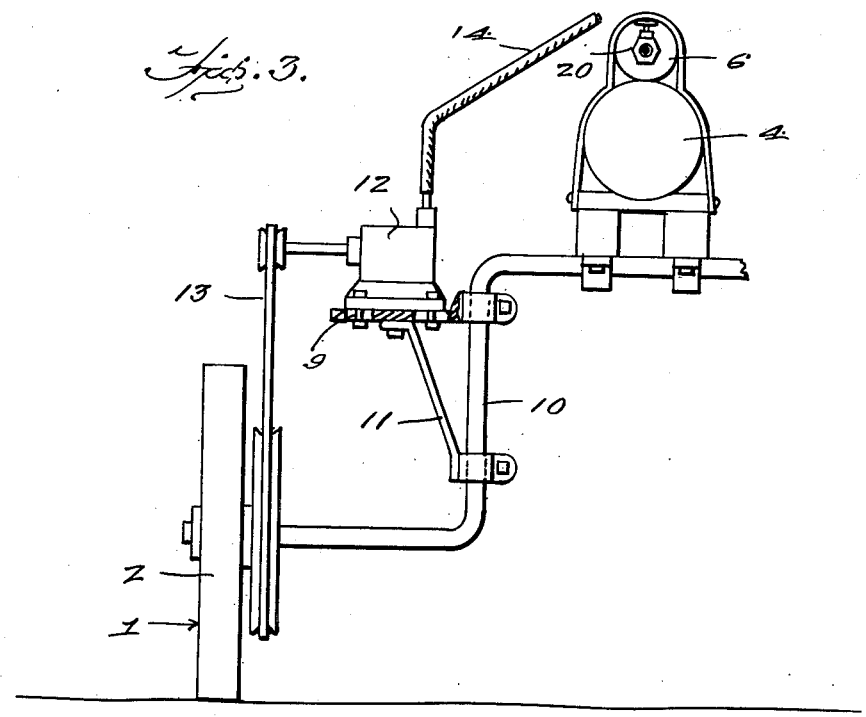
Figure 3 is a view in rear elevation, showing the mounting and drive of the air compressor on the cultivator.

As illustrated to advantage in Figure 3 of the drawings, a bracket 9 is mounted on the axle 10 of the cultivator 1, said bracket including a brace 11. An air compressor 12 is adjustably mounted on the bracket 9. The compressor 12 is driven from one of the wheels 2 of the cultivator 1 by a belt and pulley connection 13. A flexible conduit 14 connects the compressor 12 to the air tank 6.

Depending from the rear end portion of the tank 4 is a funnel 15. The funnel 15 is divided by a vertical partition 16 (see Figure 2) into chambers 17 and 18, the latter communicating with the tank 4 for receiving the fluid therefrom. An air hose 19 connects the chamber 17 with the tank 6 through a suitable control valve 20.

A pipe 21 depends from the funnel 15, said pipe communicating with the chambers 17 and 18. Mounted on the lower end of the pipe 21 is a normally closed valve 22. Threadedly connected to the lower end of the valve 22 is a removable spray nozzle 23. The valve 22 includes an operating lever 24. A coil spring 25 has one end connected to the valve lever 24 and its other end connected to one of the cultivator handles 26 for automatically opening the valve 22 when the shovels 27 of the cultivator are lowered in the usual manner to cultivating or operative position.

It is thought that the operation of the apparatus thus far described will be readily apparent from a consideration of the foregoing. Briefly, as the cultivator travels over the ground the compressor 12 is driven by one of the wheels 2 for storing air under pressure in the tank 6. Poison in liquid form from the tank 4 flows downwardly by gravity through the chamber 18 of the funnel 15 and enters the pipe 21. When the cultivator shovels 27 are lowered to working position, the coil spring 25 opens the valve 22 and the poison, under pressure of the air from the tank 6, is sprayed on the plants by the nozzle 23. The nozzle 23 moves directly over the plants to be sprayed. When the cultivator shovels 27 are raised to inoperative position the valve 22 closes for shutting off the poison and air. A suitable hook 28 is provided on the cultivator 1 for holding the shovels in raised position.

The embodiment illustrated in Figures 4 to 9, inclusive, of the drawings is for the distribution of fertilizer in liquid form. In this arrangement, a post 29 is mounted on the usual foot yoke bar 30 of the cultivator 1. Mounted on the upper portion of the post 29 is a forwardly extending bracket 31. The bracket 31 includes, on its free end, an eye 32. A transversely extending arm 33 in the form of a rod is adjustably secured in the eye 32 by a set screw 34. A clamp 35 is adjustably mounted on the arm 33. The pipe 21, with the valve 22 on its lower end, is mounted for vertical adjustment in the clamp 35. A flexible conduit 36 connects the pipe 21 to the funnel 15.

From the foregoing it will be observed that the valve 22, the members 21, 31, etc. are mounted on the cultivator for raising and lowering with the shovels thereof. It will also be noted that the valve 22 is reversed and that the opening spring 25 for said valve is connected, at one end, to the rear end of the tongue 3 of the cultivator.

The poison spray nozzle 23 is removed and a fertilizer distributing head 37 is mounted on the valve 22 in lieu thereof. The head 37 includes an internally threaded sleeve 38 which is threadedly secured, at an intermediate point, on the lower end of the valve 22 for rotary adjustment in a horizontal plane. The sleeve 37 is provided, in its lower portion, with longitudinally spaced discharge ports 39.

The head 37 further comprises control tubes 40 which are threadedly mounted for adjustment in the sleeve 38 and which project from the ends thereof. Caps 41 close the outer ends of the tubes 40. The tubes 40 have formed therein ports 42, all but the outermost of which may be brought selectively and adjustably into communication with the ports 39, with the exception of the innermost of said ports 39, for controlling and regulating the same. Lock nuts 43 secure the tubes 40 in adjusted position.

In operation, when the cultivator shovels 27 are lowered to working position, the coil spring 25 opens the valve 22. Liquid fertilizer from the tank 4 and air under pressure from the tank 6 enter the head 37 from the valve 22 and said fertilizer is uniformly distributed over a path of substantial width through the ports 39 and at times, the outermost of the ports 42. The outermost ports 42 are exposed or open only when the tubes 40 are adjusted outwardly sufficiently in the sleeve 38. The arrangement of the ports 42 is such that the ports 39, or certain of said ports 39, may be opened and closed as desired. Also, by rotating the tubes 40 a small fraction of a turn, the volume of fertilizer passing through the ports 39 may be accurately controlled as desired.

When the cultivator shovels 27 are raised, thereby elevating the valve 22, the coil spring 25 permits said valve to close.

It is believed that the many advantages of a poison or fertilizer distributing machine constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

Having described the invention, what is claimed as new is:

1. In a device of the character described, a wheeled frame, a tank, for the reception of a fluid, mounted on the frame, a funnel carried by the tank and including chambers, one of said chambers communicating with the fluid tank, a discharge pipe for the fluid connected to the funnel chambers, a compressed air tank mounted on the frame and connected to the other chamber of the funnel, a normally closed control valve for the discharge pipe, and means for opening the control valve.

2. The combination with a cultivator embodying two elements comprising a frame having supporting wheels and a support for shovels movable relative to the frame in a vertical plane to shift the shovels to operative and inoperative positions, of a fluid distributing apparatus comprising a tank, for the reception of a fluid, mounted on the cultivator frame, an air tank mounted on the cultivator frame, means operable by one of the wheels of the cultivator for compressing air in said air tank, a funnel carried by the tank and including chambers, one of the chambers communicating with the fluid tank, the other of said chambers communicating with the air tank, a discharge pipe communicating with the chambers, a normally closed control valve on said discharge pipe and having two elements embodying a casing and an operating handle, and resilient means connecting one said valve elements to one of the cultivator elements for opening the valve when the shovels are lowered to operative position, the other valve element being fixed to the other cultivator element.

3. The combination with a cultivator comprising a frame having supporting wheels, a support for shovels movable relative to the frame in a vertical plane to shift the shovels to operative and inoperative positions, and handles for the support for raising and lowering the shovels, of a tank, for the reception of a liquid poison, mounted on the cultivator frame, a discharge control valve connected and in fixed relation to said tank and having an operating handle, a spray nozzle on said valve, and a coil spring connecting the valve handle to one of the cultivator handles for opening thereby when the shovels are lowered to operative position.

JOHN H. SINGLETON.